(12) United States Patent
Hagi et al.

(10) Patent No.: US 11,881,658 B2
(45) Date of Patent: Jan. 23, 2024

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Masahiro Hagi, Yokkaichi (JP); Hirotaka Baba, Yokkaichi (JP); Takeshi Shimizu, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 234 days.

(21) Appl. No.: 17/629,622

(22) PCT Filed: Jul. 20, 2020

(86) PCT No.: PCT/JP2020/028142
§ 371 (c)(1),
(2) Date: Jan. 24, 2022

(87) PCT Pub. No.: WO2021/024781
PCT Pub. Date: Feb. 11, 2021

(65) Prior Publication Data
US 2022/0247134 A1    Aug. 4, 2022

(30) Foreign Application Priority Data

Aug. 8, 2019   (JP) .................................. 2019-146203

(51) Int. Cl.
*H01B 7/00*       (2006.01)
*H01R 13/6593*    (2011.01)
(Continued)

(52) U.S. Cl.
CPC ..... *H01R 13/6593* (2013.01); *B60R 16/0215* (2013.01); *H01B 7/0045* (2013.01); *H01R 13/5205* (2013.01); *H01R 2201/26* (2013.01)

(58) Field of Classification Search
CPC .............. H01B 7/0045; B60R 16/0215; B60R 16/0207; H01R 13/5205; H01R 13/6581
See application file for complete search history.

(56) References Cited

U.S. PATENT DOCUMENTS

2005/0193556 A1    9/2005  Ikeda
2012/0190238 A1*   7/2012  Omae ................ H01R 13/6592
                                                        439/620.01
(Continued)

FOREIGN PATENT DOCUMENTS

JP   2005-294246 A    10/2005
JP   2017-221017 A    12/2017
(Continued)

OTHER PUBLICATIONS

Sep. 1, 2020 Search Report issued in International Patent Application No. PCT/JP2020/028142.

*Primary Examiner* — Sherman Ng
(74) *Attorney, Agent, or Firm* — Oliff PLC (57) ABSTRACT

A wire harness that includes an electric wire including a core wire and an insulation coating that covers an outer circumference of the core wire; an electromagnetic shield that surrounds an outer circumference of the insulation coating; a connection terminal that is electrically connected to an end of the core wire; a connector housing that holds the connection terminal and is made of a synthetic resin; a shielding (Continued)

pipe that extends from an inside to an outside of the connector housing in a protruding manner; and a fixing member that fixes an end of the electromagnetic shield to an outer circumferential surface of a portion of the shielding pipe that is disposed outside the connector housing in an electrically connected state.

9 Claims, 2 Drawing Sheets

(51) Int. Cl.
  *B60R 16/02* (2006.01)
  *H01R 13/52* (2006.01)

(56) References Cited

U.S. PATENT DOCUMENTS

| | | | |
|---|---|---|---|
| 2015/0287497 A1 | 10/2015 | Shiga | |
| 2017/0181337 A1* | 6/2017 | Itani | H02G 3/0462 |
| 2017/0207613 A1* | 7/2017 | Nakai | H02G 3/0481 |
| 2018/0174709 A1* | 6/2018 | Hagi | B60L 15/00 |
| 2019/0380233 A1 | 12/2019 | Shimizu et al. | |

FOREIGN PATENT DOCUMENTS

| | | |
|---|---|---|
| JP | 2018-121044 A | 8/2018 |
| WO | 2014/054348 A1 | 4/2014 |

* cited by examiner

WIRE HARNESS

BACKGROUND

The present disclosure relates to a wire harness.

A conventionally known wire harness that is mounted in an automobile or the like includes a conductive path that includes a core wire, an insulation coating that covers the outer circumference of the core wire, and a shielding member that covers the outer circumference of the insulation coating. Also, a structure for grounding a shielding member has been proposed (see, for example, JP 2017-221017A).

In this type of wire harness, a shielding ring is fitted onto an end portion of the shielding member, and an end of the shielding member is folded back toward the outer circumference of the shielding ring. Then, a clamping ring is clamped and attached to the folded-back portion of the shielding member. To be more specific, the shielding ring includes a small diameter portion and a large diameter portion, and the clamping ring is clamped and attached to the small diameter portion of the shielding ring. Accordingly, the shielding member and the shielding ring are electrically connected. The large diameter portion of the shielding ring is electrically connected to a contact terminal of a connector or the like, and the shielding member is thereby grounded. A void is formed between an end portion of the shielding member that is not folded back and the shielding ring as a result of a core used to clamp the clamping ring being pulled out.

SUMMARY

With the wire harness described above, the shielding member is folded back, and the folded-back portion is connected to the shielding ring by the clamping ring, and it is therefore necessary to provide a space for folding back the shielding member. Accordingly, there is a problem in that the size of the end portion of the conductive path is large.

An exemplary aspect of the disclosure provides a wire harness in which it is possible to prevent an increase in size.

A wire harness according to the present disclosure includes: an electric wire including a core wire and an insulation coating that covers an outer circumference of the core wire; an electromagnetic shield that surrounds an outer circumference of the insulation coating; a connection terminal that is electrically connected to an end portion of the core wire; a connector housing that holds the connection terminal and is made of a synthetic resin; a shielding pipe that extends from an inside to an outside of the connector housing in a protruding manner; and a fixing member that fixes an end of the electromagnetic shield to an outer circumferential surface of a portion of the shielding pipe that is disposed outside the connector housing in an electrically connected state. An end of the electric wire is inserted in the shielding pipe while being exposed from the electromagnetic shield, and the end of the electric wire is inserted in the connector housing via the shielding pipe and is connected to the connection terminal.

The wire harness according to the present disclosure provides an advantageous effect of preventing an increase in size.

DETAILED DESCRIPTION OF EMBODIMENTS

Description of Embodiment of the Present Disclosure

First, embodiments of the present disclosure are listed and described.

[1] A wire harness including: an electric wire including a core wire and an insulation coating that covers an outer circumference of the core wire; an electromagnetic shielding member that surrounds an outer circumference of the insulation coating; a connection terminal that is electrically connected to an end portion of the core wire; a connector housing that holds the connection terminal and is made of a synthetic resin; a shielding pipe that extends from the inside to the outside of the connector housing in a protruding manner; and a fixing member that fixes an end portion of the electromagnetic shielding member to an outer circumferential surface of a portion of the shielding pipe that is disposed outside the connector housing in an electrically connected state, wherein an end portion of the electric wire is inserted in the shielding pipe while being exposed from the electromagnetic shielding member, and the end portion of the electric wire is inserted in the connector housing via the shielding pipe and is connected to the connection terminal.

With this configuration, the end portion of the electromagnetic shielding member is connected to the outer circumferential surface of the portion of the shielding pipe that is disposed outside the connector housing, the shielding pipe extending from the inside to the outside of the connector housing in a protruding manner. At this time, the end portion of the electric wire is inserted in the shielding pipe while being exposed from the electromagnetic shielding member, and is inserted in the connector housing via the shielding pipe. That is, the end portion of the electromagnetic shielding member is connected to the outer circumferential surface of the shielding pipe that protrudes in a direction opposite to the direction in which the electric wire is inserted into the connector housing. Accordingly, when connecting the electromagnetic shielding member to the outer circumferential surface of the shielding pipe, the electromagnetic shielding member can be connected to the outer circumferential surface of the shielding pipe without needing to fold back the electromagnetic shielding member. With this configuration, it is possible to favorably prevent an increase in the size of the end portion of the electric wire.

[2] It is preferable that the wire harness further includes: a first sealing member that is provided in an internal space of the portion of the shielding pipe that is disposed outside the connector housing; and a first retainer that is attached to an end portion of the shielding pipe to prevent the first sealing member from being dislodged, and the first sealing member is in intimate contact with an inner circumferential surface of the shielding pipe, and is also in intimate contact with an outer circumferential surface of the electric wire.

With this configuration, the first sealing member that is in intimate contact with the inner circumferential surface of the shielding pipe, and is also in intimate contact with the outer circumferential surface of the electric wire is provided. With the first sealing member, it is possible to favorably prevent a liquid such as water from intruding into the connector housing via the internal space of the shielding pipe. Also, with the first retainer, it is possible to prevent the first sealing member from being detached from the shielding pipe.

Accordingly, the water-resistance performance of the first sealing member can be favorably maintained.

[3] It is preferable that a protruding portion that protrudes inward in a radial direction of the shielding pipe is formed on an inner circumferential surface of the shielding pipe at a position further inside the connector housing relative to the first sealing member.

With this configuration, with the protruding portion that protrudes inward in the radial direction of the shielding pipe, it is possible to restrict the first sealing member from moving into the connector housing. Accordingly, the water-resistance performance of the first sealing member can be favorably maintained.

[4] It is preferable that the protruding portion is formed continuously around the entire inner circumferential surface of the shielding pipe in a circumferential direction of the shielding pipe. With this configuration, the protruding portion that protrudes inward in the radial direction of the shielding pipe is formed around the entire inner circumferential surface of the shielding pipe in the circumferential direction of the shielding pipe. With the protruding portion, it is possible to favorably restrict the first sealing member from moving into the connector housing.

[5] It is preferable that the first sealing member is provided at an overlapping position with the fixing member in a lengthwise direction of the shielding pipe. With this configuration, the first sealing member can be clamped radially inward by the clamping force of the fixing member. Accordingly, it is possible to favorably restrict the movement of the first sealing member.

[6] It is preferable that the shielding pipe is made of a metal, the first retainer is made of a synthetic resin, the first retainer includes a main body portion that is fitted into the shielding pipe and a covering portion that is formed on an outer circumferential surface of the main body portion, the covering portion is formed to cover an end edge of the shielding pipe from the outer side thereof in a radial direction, and the end portion of the electromagnetic shielding member is formed to surround an outer circumference of the covering portion.

With this configuration, with the main body portion of the first retainer, the electric wire can be protected from the edge of the opening end of the metal shielding pipe. Also, with the covering portion of the first retainer, the electromagnetic shielding member can be protected from the end edge of the metal shielding pipe.

[7] It is preferable that the shielding pipe, the electromagnetic shielding member, and the fixing member are formed using a metal material of the same type. With this configuration, even when water is attached to connection portions between the shielding pipe, the electromagnetic shielding member, and the fixing member, it is possible to favorably prevent bimetallic corrosion, or in other words, electrolytic corrosion from occurring.

[8] It is preferable that the wire harness further includes: a second sealing member that is provided in an internal space of the connector housing; and a second retainer that is attached to an end portion of the connector housing to prevent the second sealing member from being dislodged, and the second sealing member is in intimate contact with an inner circumferential surface of the connector housing, and is also in intimate contact with an outer circumferential surface of the shielding pipe.

With this configuration, the second sealing member that is in intimate contact with the inner circumferential surface of the connector housing, and is also in intimate contact with the outer circumferential surface of the shielding pipe is provided. With the second sealing member, it is possible to favorably prevent a liquid such as water from intruding into the connector housing through a gap between the inner circumferential surface of the connector housing and the outer circumferential surface of the shielding pipe. Also, with the second retainer, it is possible to prevent the second sealing member from being detached from the connector housing. Accordingly, the water-resistance performance of the second sealing member can be favorably maintained.

[9] It is preferable that the wire harness further includes: a conductive cylindrical member that is electrically connected to the shielding pipe in an internal space of the connector housing. With this configuration, the electromagnetic shielding member is electrically connected to the conductive cylindrical member via the shielding pipe. Accordingly, for example, by grounding the cylindrical member, the electromagnetic shielding member can be grounded via the shielding pipe.

DETAILED DESCRIPTION OF EMBODIMENT OF THE PRESENT DISCLOSURE

A specific example of the wire harness according to the present disclosure will be described below with reference to the drawings. For the sake of convenience of the description, in the drawings, some constituent elements may be shown enlarged or simplified. Also, the scaling factor of the constituent elements may vary from diagram to diagram. The terms used in the specification of the present application such as "parallel", "orthogonal", and "perpendicular" mean not only strictly parallel, orthogonal, and perpendicular, but also substantially parallel, orthogonal, and perpendicular within the scope of the present embodiment that can produce the advantageous effects thereof. It is to be noted that the present disclosure is not limited to examples given below, the scope of the present disclosure is indicated by the appended claims, and all changes that come within the meaning and range of equivalency of the claims are intended to be embraced within the scope of the present disclosure.

Figure 1:
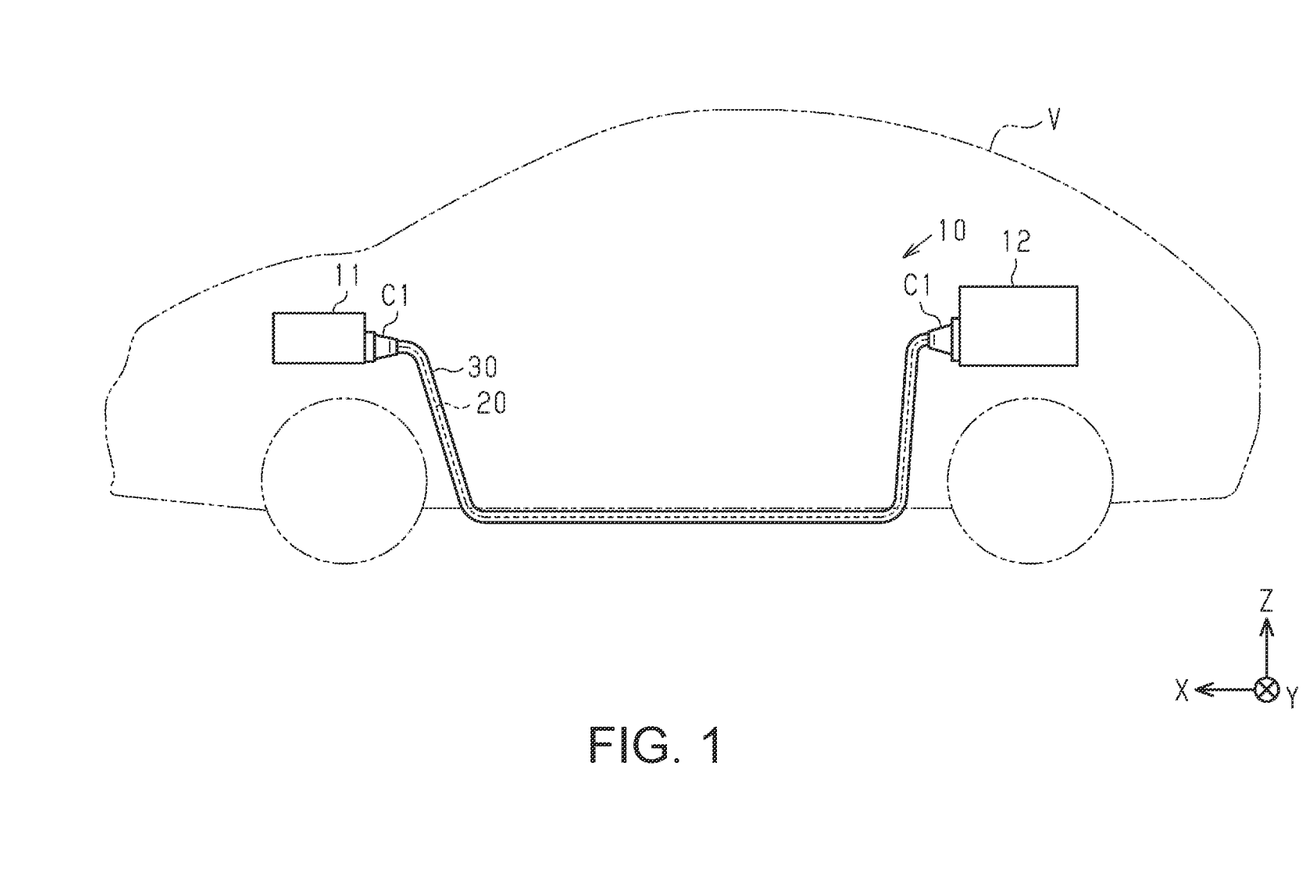
FIG. 1 is a schematic configuration diagram of a wire harness according to an embodiment.

A wire harness 10 shown in FIG. 1 connects two, three or more electric devices (devices). For example, the wire harness 10 electrically connects an inverter 11 and a high-voltage battery 12, the inverter 11 being provided in a front portion of a vehicle V such as a hybrid vehicle or an electric automobile, and the high-voltage battery 12 being provided in the rear portion of the inverter 11 in the vehicle V. The wire harness 10 is routed, for example, under the floor of the vehicle V or the like. The inverter 11 is connected to a motor (not shown) for driving wheels that serves as a power source for driving the vehicle. The inverter 11 generates alternating current power from the direct current power of the high-voltage battery 12, and supplies the generated alternating current power to the motor. The high-voltage battery 12 is, for example, a battery that can supply a voltage of several hundred volts.

Here, the left-right direction in FIG. 1 is defined as "the front-rear direction of the vehicle", a direction orthogonal to the plane of FIG. 1 is defined as "the width direction of the vehicle", and the up-down direction in FIG. 1 is defined as "the up-down direction of the vehicle". In the description given below, for the sake of convenience, a direction that extends in the front-rear direction of the vehicle will be referred to as an "X-axis direction", a direction that extends in the width direction of the vehicle will be referred to as a "Y-axis direction", and a direction that extends in the up-down direction of the vehicle will be referred to as a "Z-axis direction".

The wire harness 10 includes one or more (two in the present embodiment) electric wires 20, a pair of connectors C1 attached to two opposite end portions of the electric wires 20, an electromagnetic shielding member 25 (electromagnetic shield) that surrounds the outer circumference of each of the electric wires 20, and an exterior member 30 that collectively surrounds the plurality of electric wires 20. One end portions of the electric wires 20 are connected to the inverter 11 via one of the pair of connectors C1, and the other end portions of the electric wires 20 are connected to the high-voltage battery 12 via the other connector C1. The electric wires 20 are, for example, high-voltage electric wires that can support high voltages and large currents.

The exterior member 30 has an elongated cylindrical shape as a whole. One or more electric wires 20 are housed in the internal space of the exterior member 30. The exterior member 30 is formed so as to, for example, surround the entire outer circumference of the plurality of electric wires 20. The exterior member 30 protects the electric wires 20 housed therein from projectiles and water droplets. As the exterior member 30, for example, a pipe made of a metal or a resin, a protector made of a resin, a flexible corrugated tube made of a resin or the like, a water-resistant cover made of a rubber, or a combination thereof can be used.

In the description given below, the term "circumferential direction" when used alone refers to the circumferential direction of an electric wire 20 about the central axis thereof.

Configuration of Electric Wire 20

Figure 2:
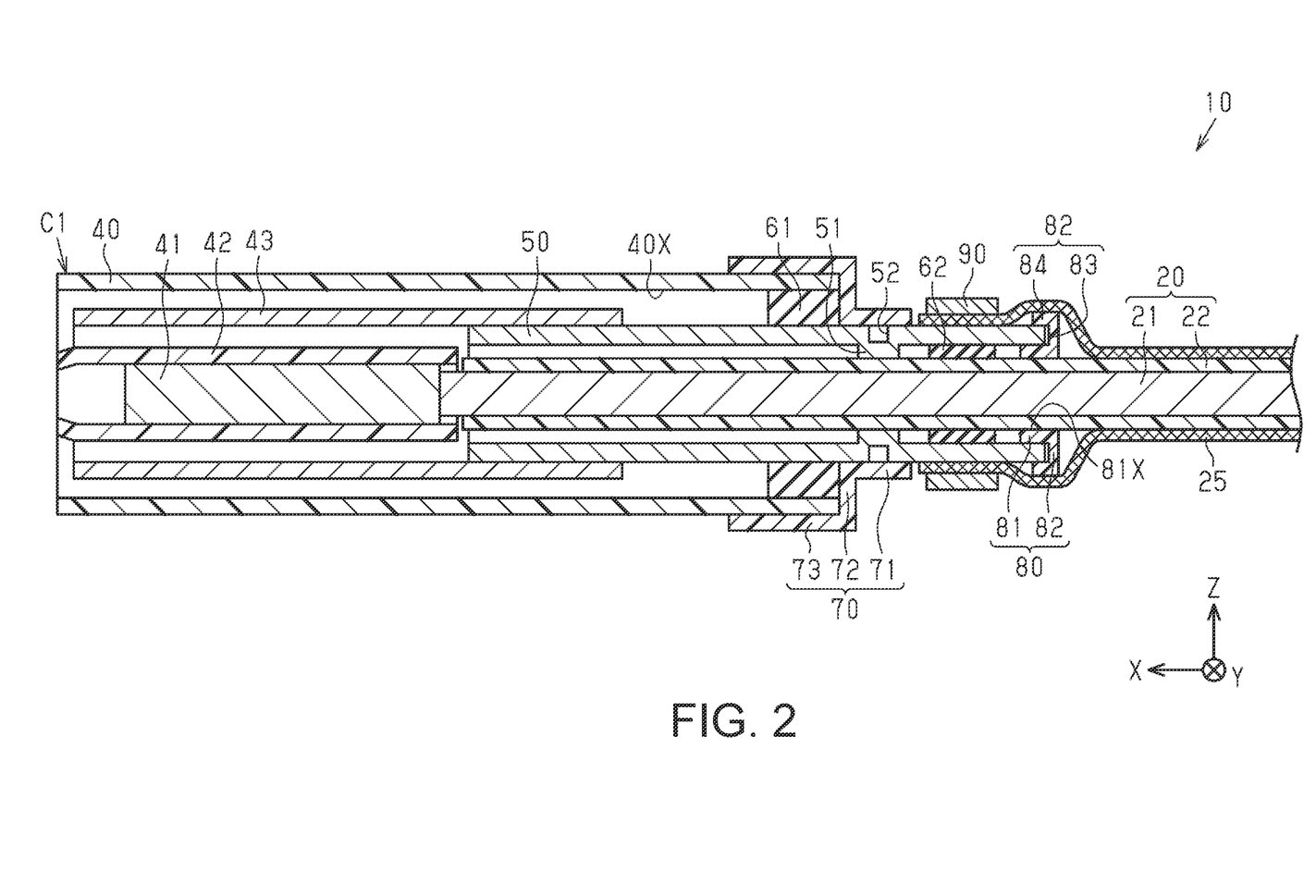
FIG. 2 is a schematic cross-sectional view of the wire harness according to the embodiment.

As shown in FIG. 2, each electric wire 20 includes a core wire 21 made of a conductor and an insulation coating 22 that covers the outer circumference of the core wire 21. The electric wire 20 is, for example, a non-shielded electric wire that does not have an electromagnetic shielding structure. As the core wire 21, for example, a twisted wire composed of a plurality of metal strands that are twisted together, a columnar conductor composed of one columnar metal rod that has a solid structure, a cylindrical conductor that has a hollow structure, or the like can be used. Alternatively, as the core wire 21, a combination of twisted wires, columnar conductors, or cylindrical conductors may be used. The columnar conductor may be, for example, a single core wire, a bus bar, or the like. The core wire 21 of the present embodiment is a twisted wire. As the material of the core wire 21, for example, metal materials such as a copper-based metal material and an aluminum-based metal material can be used. The core wire 21 is formed through, for example, extrusion molding.

A cross section of the core wire 21 taken along a plane that is orthogonal to the lengthwise direction (here, the X-axis direction) of the core wire 21 can have any shape. That is, the horizontal cross-section of the core wire 21 may have any shape. The horizontal cross-section of the core wire 21 may have, for example, a circular shape, a semicircular shape, a polygonal shape, a square shape, or a flat shape. The horizontal cross-section of the core wire 21 of the present embodiment has a circular shape.

The insulation coating 22 covers, for example, the entire outer circumferential surface of the core wire 21 in the circumferential direction thereof. The insulation coating 22 is made of, for example, an insulating material such as a synthetic resin. The insulation coating 22 can be formed by, for example, extrusion molding (extrusion coating) the core wire 21.

Configuration of Electromagnetic Shielding Member 25

The electromagnetic shielding member 25 has a cylindrical shape, and surrounds the entire outer circumference of the insulation coating 22. The electromagnetic shielding member 25 surrounds the entire outer circumference of the insulation coating 22, for example, while being in contact with the outer circumferential surface of the insulation coating 22. The electromagnetic shielding member 25 is provided, for example, individually for each electric wire 20.

As the electromagnetic shielding member 25, for example, a braided member obtained by braiding a plurality of metal strands into a cylindrical shape or a metal foil can be used. The electromagnetic shielding member 25 is more flexible than, for example, the core wire 21. As the material of the electromagnetic shielding member 25, for example, metal materials such as a copper-based metal material and an aluminum-based metal material can be used. The electromagnetic shielding member 25 of the present embodiment is a braided member made of aluminum.

In the wire harness 10 of the present embodiment, a sheath (covering member) that covers the outer circumference of the electromagnetic shielding member 25 in an intimate contact manner is not provided. Although not shown in FIG. 2, the outer circumference of the electromagnetic shielding member 25 is surrounded by the exterior member 30 (see FIG. 1).

Configuration of Connector C1

Each connector C1 includes a connector housing 40, conductive connection terminals 41, resin caps 42, conductive cylindrical members 43 (conductive cylinder), shielding pipes 50, sealing members 61 and 62 (second and first seals), and retainers 70 and 80. The following description will be given by defining a direction in which an electric wire 20 is inserted into the connector C1 as a "forward direction".

Configuration of Connector Housing 40

The connector housing 40 includes, for example, one or more insertion holes 40X. The connector housing 40 includes, for example, the same number of insertion holes 40X as the number of electric wires 20 (two in the present embodiment). The insertion holes 40X are formed in, for example, a cylindrical shape or a prismatic shape. The connector housing 40 is made using, for example, an insulating material such as a synthetic resin. As the synthetic resin, for example, a polyolefin, a polyamide, a polyester, or the like can be used.

Configuration of Connection Terminal 41

Each connection terminal 41 is provided within an insertion hole 40X. The connection terminal 41 is inserted, for example, into a cylindrical resin cap 42 provided within the insertion hole 40X. The connection terminal 41 is electrically connected to a terminal end portion of the electric wire 20. As the material of the connection terminal 41, for example, metal materials such as copper, a copper alloy, aluminum, an aluminum alloy, and stainless steel can be used. The connection terminal 41 may be subjected to surface treatment such as silver plating, tin plating or aluminum plating according to the type of metal that constitutes the connection terminal 41 and the use environment.

The end portion of the electric wire 20 is exposed from the electromagnetic shielding member 25. The end portion of the electric wire 20 is inserted in the connector C1 while being exposed from the electromagnetic shielding member 25. In the terminal end portion of the electric wire 20 inserted in the connector C1, a terminal end portion of the core wire 21 is exposed from the insulation coating 22. For example, in the terminal end portion of the electric wire 20, a predetermined length of the insulation coating 22 is stripped from the end of the electric wire 20, and the terminal end portion of the core wire 21 is exposed from the insulation coating 22. The terminal end portion of the electric wire 20 is inserted in the resin cap 42, with the terminal end portion of the core wire 21 being exposed from the insulation coating 22. For example, only the core wire 21 of the electric wire 20 is inserted in the resin cap 42 from a rear opening portion of the resin cap 42. The connection terminal 41 is connected to, for example, the terminal end portion of the core wire 21 exposed from the insulation coating 22. The connection terminal 41 is connected to the core wire 21 by, for example, compression or ultrasonic welding, or the like. The connection terminal 41 and the core wire 21 are thereby electrically connected.

The connection terminal 41 is electrically connected to, for example, a partner terminal (not shown). The partner terminal is, for example, inserted into the resin cap 42 from a front opening portion of the resin cap 42 and is electrically connected to the connection terminal 41. The partner terminal may be, for example, the terminal portion of a bus bar or an electric device, or a terminal of a different electric wire.

Configuration of Resin Cap 42

Each resin cap 42 is formed to, for example, surround the entire outer circumference of the connection terminal 41 in the circumferential direction. The resin cap 42 is formed such that the inner circumference of the resin cap 42 has a cross-sectional shape that corresponds to, for example, that of the outer circumference of the connection terminal 41. The resin cap 42 is formed to be longer than, for example, the connection terminal 41 in the X-axis direction. The resin cap 42 is made using, for example, an insulating material such as a synthetic resin. As the synthetic resin, for example, a polyolefin, a polyamide, a polyester, or the like can be used. The resin cap 42 may be composed of, for example, a plurality of components.

Configuration of Cylindrical Member 43

Each cylindrical member 43 has a cylindrical shape. The cylindrical member 43 is formed in, for example, a cylindrical shape or a prismatic shape. As the material of the cylindrical member 43, for example, metal materials such as a copper-based metal material and an aluminum-based metal material can be used. Although not shown in the diagrams, the cylindrical member 43 is grounded (connected to the ground). For example, the cylindrical member 43 is grounded via the metal housing of an electric device that is connected to the connector C1, the contact terminal of the partner connector, or the like.

The cylindrical member 43 is provided, for example, in the insertion hole 40X. The cylindrical member 43 is formed to, for example, surround the entire outer circumference of the resin cap 42 in the circumferential direction thereof. The cylindrical member 43 is formed to be longer than, for example, the resin cap 42 in the X-axis direction. However, a front end portion of the resin cap 42 is formed to, for example, protrude past a front end portion of the cylindrical member 43. Accordingly, the front end portion of the resin cap 42 of the present embodiment is exposed from the cylindrical member 43.

The cylindrical member 43 is formed to, for example, extend rearward past a rear end portion of the resin cap 42. A rear end portion of the cylindrical member 43 is formed to, for example, surround the entire outer circumference of a portion of the end portion of the electric wire 20 in the circumferential direction thereof. The rear end portion of the cylindrical member 43 is provided to, for example, surround the outer circumference of a portion of the end portion of the electric wire 20 where the core wire 21 is covered by the insulation coating 22.

Configuration of Shielding Pipe 50

Each shielding pipe 50 is formed in a cylindrical shape that includes an outer surface in the radial direction (outer circumferential surface), an inner surface in the radial direction (inner circumferential surface), and a length. The shielding pipe 50 is formed such that the outer circumference of the shielding pipe 50 has a shape that corresponds to, for example, that of the inner circumference of the cylindrical member. The shielding pipe 50 is formed in, for example, a cylindrical shape or a prismatic shape. As the material of the shielding pipe 50, for example, a conductive material can be used. As the material of the shielding pipe 50, for example, metal materials such as a copper-based metal material and an aluminum-based metal material can be used. As the material of the shielding pipe 50, a conductive resin material may also be used. As the resin material, for example, synthetic resins such as a polyolefin, a polyamide, and a polyester can be used. The shielding pipe 50 of the present embodiment is a metal pipe made of aluminum.

The shielding pipe 50 is provided such that, for example, a portion of the shielding pipe 50 is provided inside the connector housing 40 and the other portion is provided outside the connector housing 40. A front end portion of the shielding pipe 50 is provided, for example, inside the insertion hole 40X of the connector housing 40. A rear end portion of the shielding pipe 50 is provided, for example, outside the connector housing 40 on the rear side thereof. That is, the shielding pipe 50 is formed to protrude from the inside of the connector housing 40 and extend toward the outside of the connector housing 40 on the rear side thereof. In other words, the shielding pipe 50 is formed to be inserted into the insertion hole 40X from the outside of the connector housing 40 on the rear side thereof.

The front end portion of the shielding pipe 50 is fitted to, for example, the cylindrical member 43 in the insertion hole 40X. The front end portion of the shielding pipe 50 is fitted into, for example, the cylindrical member 43. The outer diameter of the shielding pipe 50 of the present embodiment is set to be slightly smaller than the inner diameter of the cylindrical member 43. The shielding pipe 50 is connected to the cylindrical member 43 through, for example, compression or ultrasonic welding, or the like. The shielding pipe 50 and the cylindrical member 43 are thereby electrically connected. The front end portion of the shielding pipe 50 is formed to, for example, surround the outer circumference of a portion of the electric wire 20 inserted in the insertion hole 40X in the circumferential direction.

The rear end portion of the shielding pipe 50 is formed to, for example, protrude rearward past the rear end portion of the connector housing 40. The outer diameter of the rear end portion of the shielding pipe 50 is formed to be smaller than, for example, the inner diameter of the insertion hole 40X. The rear end portion of the shielding pipe 50 is formed to, for example, surround the entire outer circumference of a portion of the electric wire 20 disposed outside the connector housing 40 in the circumferential direction. The rear end portion of the shielding pipe 50 is formed to surround the entire outer circumference of the electric wire 20 exposed from the electromagnetic shielding member 25 in the circumferential direction.

On the inner circumferential surface of the rear end portion of the shielding pipe 50, for example, a protruding portion 51 (protrusion) that protrudes inward in the radial direction of the shielding pipe 50 is formed. The protruding portion 51 is formed, for example, continuously and entirely around the inner circumferential surface of the shielding pipe 50 in the circumferential direction thereof. The protruding portion 51 is formed in a closed annular shape. A protruding leading end of the protruding portion 51 is in contact with, for example, the outer circumferential surface of the insulation coating 22 in at least a portion of the shielding pipe 50 in the circumferential direction. The protruding portion 51 is formed, for example, only in a portion of the shielding pipe 50 in the lengthwise direction (here, the X-axis direction) of the shielding pipe 50.

Here, the protruding portion 51 is formed on the inner circumferential surface of the shielding pipe 50 by, for example, relatively rotating a jig (not shown) and the shielding pipe 50 that is a processing target while the jig is abutted against the shielding pipe 50 from the outside of the shielding pipe 50 so as to plastically deform and reduce the diameter of the shielding pipe 50. As the processing method for plastically deforming the shielding pipe 50, spinning processing, swaging processing, or the like can be used. As a result of the protruding portion 51 being formed in the manner described above, a groove portion 52 is formed in the outer circumferential surface of the shielding pipe 50 at a position corresponding to the protruding portion 51. That is, the outer diameter of the portion of the shielding pipe 50 in the X-axis direction where the protruding portion 51 is formed is smaller than the outer diameter of the portion of the shielding pipe 50 where the protruding portion 51 is not formed. The protruding portion 51 is formed, for example, before an electric wire 20 and a sealing member 62 are inserted into the shielding pipe 50.

The protruding portion 51 functions as, for example, a restricting member that restricts the sealing member 62 from moving forward in the X-axis direction. Also, the protruding portion 51 functions as, for example, a positioning member that positions the sealing member 62 in the X-axis direction.

Configuration of Sealing Member 61

An annular sealing member 61 is attached to the rear end portion of the connector housing 40. As the sealing member 61, for example, a rubber stopper can be used. The sealing member 61 is provided at, for example, the rear end portion of the insertion hole 40X. The sealing member 61 is fitted into the insertion hole 40X and is also fitted onto the shielding pipe 50. The outer circumference of the sealing member 61 has a shape that corresponds to, for example, the shape of the inner circumference of the insertion hole 40X. The inner circumference of the sealing member 61 has a shape that corresponds to, for example, the shape of the outer circumference of the shielding pipe 50. For example, the outer circumferential surface of the sealing member 61 is in intimate contact with the entire inner circumferential surface of the insertion hole 40X in the circumferential direction in a liquid-tight manner, and the inner circumferential surface of the sealing member 61 is in intimate contact with the entire outer circumferential surface of the shielding pipe 50 in the circumferential direction in a liquid-tight manner. The sealing member 61 is held between, for example, the inner circumferential surface of the insertion hole 40X and the outer circumferential surface of the shielding pipe 50 while being in intimate contact with the insertion hole 40X and the shielding pipe 50 over the entire circumferential direction thereof. With this configuration, it is possible to prevent a liquid such as water from intruding into the insertion hole 40X and the connector housing 40 from the rear opening portion of the insertion hole 40X.

Configuration of Retainer 70

A retainer 70 that prevents the sealing member 61 from being dislodged is attached to the rear end portion of the connector housing 40. The retainer 70 functions as, for example, a restricting member that restricts the sealing member 61 from moving rearward in the X-axis direction. The retainer 70 is formed to close off, for example, the rear opening portion of the insertion hole 40X. The retainer 70 of the present embodiment is provided on the outer side of the connector housing 40 (the insertion hole 40X).

The retainer 70 includes, for example, a cylinder portion 71 that is fitted onto the rear end portion of the shielding pipe 50, a wall portion 72 that is formed to protrude radially outward from the outer circumferential surface of the cylinder portion 71, and a covering portion 73 (cover) that extends forward from a radially outer end portion of the wall portion 72. The retainer 70 is, for example, a single component obtained by integrally forming the cylinder portion 71, the wall portion 72, and the covering portion 73. The retainer 70 is made, for example, using an insulating material such as a synthetic resin. As the synthetic resin, for example, a polyolefin, a polyamide, a polyester, or the like can be used.

The cylinder portion 71 is formed in a cylindrical shape that includes an outer surface in the radial direction (outer circumferential surface), an inner surface in the radial direction (inner circumferential surface), and a length. The cylinder portion 71 is formed in, for example, a cylindrical shape or a prismatic shape. The cylinder portion 71 is formed to, for example, surround the entire outer circumference of the shielding pipe 50 in the circumferential direction thereof. The inner circumferential surface of the cylinder portion 71 is in contact with, for example, the outer circumferential surface of the shielding pipe 50.

The wall portion 72 is formed to, for example, extend perpendicularly and radially outward from the outer circumferential surface of the cylinder portion 71. The wall portion 72 is in contact with, for example, a rear end face of the connector housing 40. The wall portion 72 is in contact with, for example, a rear face of the sealing member 61. The wall portion 72 may be formed only on a portion of the cylinder portion 71 in the circumferential direction of the cylinder portion 71, or on the entire cylinder portion 71 in the circumferential direction of the cylinder portion 71.

The covering portion 73 is formed to cover, for example, an outer circumferential surface of the connector housing 40. The covering portion 73 is formed to extend, for example, in parallel to the outer circumferential surface of the cylinder portion 71. Although not shown in the diagram, the covering portion 73 includes, for example, an engaging portion that engages with the outer circumferential surface of the connector housing 40. The retainer 70 is attached to the rear end portion of the connector housing 40 as a result of, for example, the engaging portion provided on the covering portion 73 being engaged with the outer circumferential surface of the connector housing 40.

Configuration of Sealing Member 62

An annular sealing member 62 is attached to the rear end portion of the shielding pipe 50. As the sealing member 62, for example, a rubber stopper can be used. The sealing member 62 is attached to, for example, the shielding pipe 50 on the rear side of the protruding portion 51. The sealing member 62 is fitted into the shielding pipe 50 and is also fitted onto the electric wire 20. The outer circumference of the sealing member 62 has a shape that corresponds to, for example, the shape of the inner circumference of the shielding pipe 50. The inner circumference of the sealing member 62 has a shape that corresponds to, for example, the shape of the outer circumference of the insulation coating 22. For example, the outer circumferential surface of the sealing member 62 is in intimate contact with the entire inner circumferential surface of the shielding pipe 50 in the circumferential direction thereof in a liquid-tight manner, and the inner circumferential surface of the sealing member 62 is intimate contact with the entire outer circumferential surface of the insulation coating 22 of the electric wire 20 in the circumferential direction thereof in a liquid-tight manner. The sealing member 62 is held between, for example, the inner circumferential surface of the shielding pipe 50 and the outer circumferential surface of the insulation coating 22 while being in intimate contact with the shielding pipe 50 and the insulation coating 22 over the entire circumferential direction thereof. With this configuration, it is possible to prevent a liquid such as water from intruding into the shielding pipe 50 from the rear end of the shielding pipe 50.

Configuration of Retainer 80

A retainer 80 that prevents the sealing member 62 from being dislodged is attached to the rear end portion of the shielding pipe 50. The retainer 80 functions as a restricting member that restricts, for example, the sealing member 62 from moving rearward in the X-axis direction. The retainer 80 is attached to the shielding pipe 50 by, for example, being inserted into the shielding pipe 50. The retainer 80 functions to protect the electric wire 20 from a rear opening end edge of the shielding pipe 50 by, for example, being disposed in the metal shielding pipe 50. The retainer 80 is formed to cover, for example, the end edge of the shielding pipe 50. The retainer 80 functions to protect, for example, the electromagnetic shielding member 25 from the rear end edge of the shielding pipe 50. The retainer 80 is attached to the rear end portion of the shielding pipe 50 after, for example, the end portion of the electric wire 20 has been inserted into the shielding pipe 50 and the sealing member 62 has been attached to the rear end portion of the shielding pipe 50.

The retainer 80 includes, for example, a cylindrical main body portion 81 (main body) and a covering portion 82 (cover) that is formed on an outer circumferential surface of the main body portion 81. The retainer 80 is, for example, a single component obtained by integrally forming the main body portion 81 and the covering portion 82. The retainer 80 is made using, for example, an insulating material such as a synthetic resin. As the synthetic resin, for example, a polyolefin, a polyamide, a polyester, or the like can be used.

The main body portion 81 is fitted into, for example, the rear end portion of the shielding pipe 50. The main body portion 81 includes, for example, a through hole 81X that extends through in the main body portion 81 in the X-axis direction. An electric wire 20 is inserted in the through hole 81X. In other words, the through hole 81X is formed in a size that allows insertion of the electric wire 20. The main body portion 81 is formed to, for example, close a gap between the inner circumferential surface of the shielding pipe 50 and the outer circumferential surface of the insulation coating 22. The outer circumferential surface of the main body portion 81 is in contact with, for example, the inner circumferential surface of the shielding pipe 50. The inner circumferential surface of the through hole 81X is in contact with, for example, the outer circumferential surface of the insulation coating 22.

On the outer circumferential surface of the main body portion 81, a covering portion 82 that protrudes radially outward from the outer circumferential surface is formed. The covering portion 82 is formed on the outer circumferential surface of a rear end portion of the main body portion 81. The covering portion 82 may be formed only on a portion of the main body portion 81 in the circumferential direction of the main body portion 81, or on the entire main body portion 81 in the circumferential direction of the main body portion 81.

The covering portion 82 includes a wall portion 83 that is formed to protrude radially outward from the outer circumferential surface of the main body portion 81 and a flange portion 84 that is formed to extend forward from a radially outer end portion of the wall portion 83 in the X-axis direction. The wall portion 83 is formed to, for example, extend perpendicularly and radially outward from the outer circumferential surface of the main body portion 81. The height of the wall portion 83 is set to be, for example, slightly larger than the thickness of the shielding pipe 50. The flange portion 84 is formed to, for example, extend in parallel to the outer circumferential surface of the main body portion 81. When the retainer 80 is attached to the rear end portion of the shielding pipe 50, the rear end portion of the shielding pipe 50 is housed in a space surrounded by the outer circumferential surface of the main body portion 81, the wall portion 83, and the flange portion 84. That is, when the retainer 80 is attached to the rear end portion of the shielding pipe 50, the rear end edge of the shielding pipe 50 is covered by the covering portion 82. At this time, the flange portion 84 is provided to cover the outer circumferential surface of the shielding pipe 50 from the outside in the radial direction.

The end portion of the electromagnetic shielding member 25 is, for example, bulged to be spaced apart from the insulation coating 22 of the electric wire 20. The end portion of the electromagnetic shielding member 25 is formed to have an opening width (opening diameter) larger than the other portion of the electromagnetic shielding member 25. The end portion of the electromagnetic shielding member 25 is formed to, for example, entirely surround the outer circumference of the retainer 80 in the circumferential direction thereof. For example, the end portion of the electromagnetic shielding member 25 is formed to surround the entire outer circumference of the covering portion 82 that covers the rear end edge of the shielding pipe 50 in the circumferential direction thereof. That is, the end portion of the electromagnetic shielding member 25 is formed to have a large opening width (opening diameter) that can surround the outer circumference of the covering portion 82. A terminal end portion of the electromagnetic shielding member 25 is fixed to the outer circumferential surface of the rear end portion of the shielding pipe 50. That is, the terminal end portion of the electromagnetic shielding member 25 is fixed to the outer circumferential surface of a portion of the shielding pipe 50 that is disposed outside the connector housing 40. The terminal end portion of the electromagnetic shielding member 25 is fixed in direct contact with, for example, the outer circumferential surface of the rear end portion of the shielding pipe 50. The terminal end portion of the electromagnetic shielding member 25 is formed to surround the entire outer circumference of the shielding pipe 50 in the circumferential direction thereof. That is, the terminal end portion of the electromagnetic shielding member 25 is formed to have a large opening width that can surround the outer circumference of the shielding pipe 50. Here, the shielding pipe 50 is formed to have an outer shape larger than the outer shape of the electric wire 20. Also, the covering portion 82 is formed to have an outer shape larger than the outer shape of the shielding pipe 50. Accordingly, the end portion of the electromagnetic shielding member 25 of the present embodiment is formed such that the opening width is largest at a portion that surrounds the covering portion 82, and decreases from the portion toward the terminal end portion. The end portion of the electromagnetic shielding member 25 is formed to surround the outer circumference of the shielding pipe 50 without being folded back in a direction (here, the rear direction) opposite to the direction in which the electric wire 20 is inserted into the connector housing 40.

Configuration of Clamping Ring 90

The wire harness 10 includes a clamping ring 90 that connects the terminal end portion of the electromagnetic shielding member 25 to the outer circumferential surface of the shielding pipe 50. The clamping ring 90 is fitted onto, for example, the shielding pipe 50, with the terminal end portion of the electromagnetic shielding member 25 being interposed between the clamping ring 90 and the outer circumferential surface of the shielding pipe 50. The clamping ring 90 is formed in a cylindrical shape that conforms to, for example, the outer circumferential surface of the shielding pipe 50. As a result of the clamping ring 90 being clamped, the terminal end portion of the electromagnetic shielding member 25 is fixedly attached to the outer circumferential surface of the shielding pipe 50 while being in direct contact with the outer circumferential surface of the shielding pipe 50. With this configuration, electric connection between the electromagnetic shielding member 25 and the shielding pipe 50 is stably ensured. As a result, the electromagnetic shielding member 25 is grounded via the shielding pipe 50 and the cylindrical member 43.

As the material of the clamping ring 90, for example, metal materials such as a copper-based metal material and an aluminum-based metal material can be used. The clamping ring 90 of the present embodiment is made using an aluminum-based metal material. The clamping ring 90 can be formed, for example, in the manner described below. First, a cylindrical aluminum pipe with an inner diameter larger than the outer diameter of the shielding pipe 50 is disposed on the outer side of the electromagnetic shielding member 25 that is fitted around the rear end portion of the shielding pipe 50. That is, the aluminum pipe is disposed on the outer side of the electromagnetic shielding member 25 to overlap the shielding pipe 50 and the electromagnetic shielding member 25 in the radial direction thereof. Next, by using a die or the like, the aluminum pipe is pressed radially inward and substantially entirely in the circumferential direction. As a result, the aluminum pipe is plastically deformed so as to reduce the diameter of the aluminum pipe, and the clamping ring 90 is thereby formed.

In the present embodiment, the shielding pipe 50, the electromagnetic shielding member 25, and the clamping ring 90 are made using the same type of metal material. Specifically, all of the shielding pipe 50, the electromagnetic shielding member 25, and the clamping ring 90 are made using an aluminum-based metal material. That is, all of the shielding pipe 50, the electromagnetic shielding member 25, and the clamping ring 90 are made using aluminum or an aluminum alloy. For this reason, even when water is attached to connection portions between the shielding pipe 50, the electromagnetic shielding member 25, and the clamping ring 90, it is possible to favorably prevent bimetallic corrosion (or in other words, electrolytic corrosion) from occurring.

Next, advantageous effects of the present embodiment will be described.

(1) A wire harness 10 includes: an electric wire 20 including a core wire 21 and an insulation coating 22 that covers an outer circumference of the core wire 21; an electromagnetic shielding member 25 that surrounds an outer circumference of the insulation coating 22; and a connection terminal 41 that is electrically connected to an end portion of the core wire 21. The wire harness 10 further includes: a connector housing 40 that holds the connection terminal 41 and is made of a synthetic resin; and a shielding pipe 50 that extends from the inside to the outside of the connector housing 40 in a protruding manner. The wire harness 10 further includes a clamping ring 90 that fixes an end portion of the electromagnetic shielding member 25 to an outer circumferential surface of a portion of the shielding pipe 50 that is disposed outside the connector housing 40 in an electrically connected state. An end portion of the electric wire 20 is inserted in the shielding pipe 50 while being exposed from the electromagnetic shielding member 25. The end portion of the electric wire 20 is inserted in the connector housing 40 via the shielding pipe 50 and is connected to the connection terminal 41.

With this configuration, the end portion of the electromagnetic shielding member 25 is connected to the outer circumferential surface of the portion of the shielding pipe 50 that is disposed outside the connector housing 40, the shielding pipe 50 extending from the inside to the outside of the connector housing 40 in a protruding manner. At this time, the end portion of the electric wire 20 is inserted in the shielding pipe 50 while being exposed from the electromagnetic shielding member 25, and is inserted in the connector housing 40 via the shielding pipe 50. That is, the end portion of the electromagnetic shielding member 25 is connected to the outer circumferential surface of the shielding pipe 50 that protrudes in a direction opposite to the direction in which the electric wire 20 is inserted into the connector housing 40. Accordingly, when connecting the electromagnetic shielding member 25 to the outer circumferential surface of the shielding pipe 50, the electromagnetic shielding member 25 can be connected to the outer circumferential surface of the shielding pipe 50 without needing to fold back the electromagnetic shielding member 25. With this configuration, there is no need to provide a space for folding back the shielding member 25. Accordingly, it is possible to prevent an increase in the size of the end portion of the electric wire 20.

(2) The processing of the terminal end portion of the electromagnetic shielding member 25 is performed outside the connector housing 40. With this configuration, the structure of the electromagnetic shielding member 25 can be selected freely from the following structures: a structure in which the electromagnetic shielding member 25 individually covers each electric wire 20; and a structure in which the electromagnetic shielding member 25 collectively covers a plurality of electric wires 20. As a result, the degree of freedom in the design of the electromagnetic shielding member 25 can be improved, and eventually, the degree of freedom in the design of the wire harness 10 can be improved.

(3) In a conventional wire harness, after a shielding member is clamped to a shielding ring fitted around a core, the core is pulled out. Accordingly, when the electric wire is bent after the core has been pulled out, the shielding ring is likely to be displaced. That is, the shielding ring is likely to be displaced in the connector housing. Then, a problem arises in that, for example, an electric connection between the large diameter portion of the shielding ring and the contact terminal of the connector is unlikely to be ensured.

In contrast, with the wire harness 10 according to the present embodiment, the processing of the terminal end portion of the electromagnetic shielding member 25 is completed outside the connector housing 40. With this configuration, the electric wire 20 can be bent after the processing of the terminal end portion of the electromagnetic shielding member 25 has been completed, specifically, after the electromagnetic shielding member 25 has been grounded via the shielding pipe 50. Accordingly, the bending process performed on the electric wire 20 is unlikely to have an influence. That is, even when the electric wire 20 is bent after the terminal end portion of the electromagnetic shielding member 25 has been connected to the shielding pipe 50, an electric connection between the electromagnetic shielding member 25 and the shielding pipe 50 can be favorably ensured.

(4) A sheathless structure that does not use a sheath that covers the outer circumference of the electromagnetic shielding member 25 in intimate contact manner is used. With this configuration, not using a sheath contributes to a reduction in the diameter of the wire harness 10 and the weight of the wire harness 10. Also, because a sheath is not used, there is no need to perform the step of stripping the sheath to expose the electromagnetic shielding member 25 to the outside when connecting the electromagnetic shielding member 25 to the shielding pipe 50. For this reason, the workability when electrically connecting the electromagnetic shielding member 25 to the shielding pipe 50 can be improved.

(5) A sealing member 62 is provided that is brought into intimate contact with the inner circumferential surface of the shielding pipe 50 and is also brought into intimate contact with the outer circumferential surface of the electric wire 20. With this configuration, it is possible to prevent a liquid such as water from intruding into the connector housing 40 through the internal space of the shielding pipe 50.

(6) The sealing member 62 is provided inside the shielding pipe 50. Accordingly, it is possible to prevent an increase in the size of the wire harness 10 as compared with the case where a water-resistant structure is provided outside the shielding pipe 50.

(7) A retainer 80 that prevents the sealing member 62 from being dislodged is attached to the rear end portion of the shielding pipe 50. With the retainer 80, it is possible to prevent the sealing member 62 from being detached from the shielding pipe 50. Furthermore, in the shielding pipe 50, a protruding portion 51 that protrudes inward in the radial direction of the shielding pipe 50 is formed on the inner circumferential surface of the connector housing 40 relative to the sealing member 62. With the protruding portion 51, it is possible to prevent the sealing member 62 from moving toward the inner side of the connector housing 40. Accordingly, it is possible to favorably maintain the water-resistance performance of the sealing member 62.

(8) The shielding pipe 50 is made of a metal, and the retainer 80 is made of a synthetic resin. The retainer 80 includes a main body portion 81 that is fitted into the shielding pipe 50 and a covering portion 82 that is formed on the outer circumferential surface of the main body portion 81. The covering portion 82 is formed to cover the end edge of the shielding pipe 50 from the outside in the radial direction thereof. The end portion of the electromagnetic shielding member 25 is formed to surround the outer circumference of the covering portion 82.

With this configuration, with the main body portion 81 of the retainer 80, the electric wire 20 can be protected from the opening end edge of the metal shielding pipe 50. Also, with the covering portion 82 of the retainer 80, the electromagnetic shielding member 25 can be protected from the end edge of the metal shielding pipe 50.

(9) The shielding pipe 50, the electromagnetic shielding member 25, and the clamping ring 90 are made using the same type of metal material. With this configuration, even when water is attached to connection portions between the shielding pipe 50, the electromagnetic shielding member 25, and the clamping ring 90, it is possible to favorably prevent electrolytic corrosion from occurring. Accordingly, the connection portions between the shielding pipe 50, the electromagnetic shielding member 25, and the clamping ring 90 can be configured to have a non-water-resistant structure that does not include a rubber cover or the like that covers the connection portions. As a result, it is possible to prevent an increase in the size of the wire harness 10 and an increase in the number of components.

(10) The shielding pipe 50, the electromagnetic shielding member 25, and the clamping ring 90 are made using an aluminum-based metal material, and thus the weight of the wire harness 10 as a whole can be reduced.

(11) A cylindrical braided member is used as the electromagnetic shielding member 25. Here, the braided member is made by braiding thin metal strands. Accordingly, the braided member has a large surface area, and electrolytic corrosion is therefore likely to occur. Furthermore, the metal strands are thin metal wires, and thus the metal strands are easily broken due to electrolytic corrosion, which may significantly reduce the shielding performance. In contrast, in the wire harness 10 of the present embodiment, the occurrence of electrolytic corrosion in the electromagnetic shielding member 25 is prevented by making the shielding pipe 50, the electromagnetic shielding member 25, and the clamping ring 90 using the same type of metal material. Accordingly, breakage of the metal strands of the electromagnetic shielding member due to electrolytic corrosion can be favorably prevented, and the reduction in the shielding performance can be favorably prevented.

Out of the entire length of the shielding pipe 50, a portion that is housed in the connector housing 40 may be referred to as "a housed portion of the shielding pipe 50" or "a first length portion", and a portion that extends from the connector housing 40 may be referred to as "an extension portion of the shielding pipe 50" or "a second length portion". The end portion of the electromagnetic shielding member 25 has an overlapping length with the outer circumferential surface of the extension portion of the shielding pipe 50, and the inner circumferential surface of the end portion of the electromagnetic shielding member 25 is in direct contact with the outer circumferential surface of the extension portion of the shielding pipe 50. The end portion of the electromagnetic shielding member 25 is not folded back. The end portion of the electromagnetic shielding member 25 is in contact with the inner circumferential surface of the clamping ring 90, but does not have a folded-back portion that covers the outer circumferential surface of the clamping ring 90. Accordingly, the length of the material of the electromagnetic shielding member 25 can be shortened, which is advantageous in reducing the material cost and the weight.

The protruding portion 51 of the shielding pipe 50 may also be referred to as a "radially inwardly protruding portion" or "reduced diameter portion" that forms a step on the inner circumferential surface of the shielding pipe 50. The groove portion 52 that corresponds to the protruding portion 51 is formed in the outer circumferential surface of the shielding pipe 50, and thus the groove portion 52 is helpful in confirming the position of the protruding portion 51 that is provided within the shielding pipe 50 from the outside of the shielding pipe 50 with, for example, a visual inspection, an optical means, or a magnetic means, and is ultimately helpful in estimating the position of the sealing member 62.

Other Embodiments

The embodiment given above can be carried out by making changes as described below. The embodiment given above and variations described below may be combined in any way as long as the combination is not technically contradictory.

There is no particular limitation on the internal structure of the connector housing 40 of the embodiment given above. For example, the resin cap 42 may be omitted. Also, the cylindrical member 43 may be omitted. In this case, for example, the shielding pipe 50 is grounded via the metal housing of an electric device that is connected to the connector C1, the contact terminal of the partner connector, or the like.

All of the shielding pipe 50, the electromagnetic shielding member 25, and the clamping ring 90 of the present embodiment given above may be made using a copper-based metal material.

In the embodiment given above, the shielding pipe 50, the electromagnetic shielding member 25, and the clamping ring 90 are made using the same type of metal material. The configuration is not limited thereto, and the shielding pipe 50, the electromagnetic shielding member 25, and the clamping ring 90 may be made using different metal materials.

There is no particular limitation on the structure of the retainer 70 of the embodiment given above. For example, the structure of the retainer 70 may be changed to a structure in which the retainer 70 is fitted into the connector housing 40.

The retainer 70 of the embodiment given above may be omitted.

There is no particular limitation on the structure of the retainer 80 of the embodiment given above. For example, the flange portion 84 may be omitted. Also, the covering portion 82 may be omitted. In this case, for example, the retainer 80 is composed of only the main body portion 81. For example, the main body portion 81 may be omitted. In this case, for example, the retainer 80 is composed of only the wall portion 83 and the flange portion 84.

The retainer 80 of the embodiment given above may be omitted.

In the embodiment given above, the protruding portion 51 is formed on the entire inner circumferential surface of the shielding pipe 50 in the circumferential direction. The configuration is not limited thereto, and, for example, the protruding portion 51 may be formed only on a portion of the inner circumferential surface of the shielding pipe 50 in the circumferential direction thereof. In this case, the protruding portion 51 may be formed through, for example, emboss processing or the like.

The protruding portion 51 of the embodiment given above may be omitted.

In the embodiment given above, the sealing member 62 is provided at an overlapping position with the clamping ring 90 in the lengthwise direction of the shielding pipe 50. The configuration is not limited thereto, and the sealing member 62 may be provided at a non-overlapping portion with the clamping ring 90 in the lengthwise direction of the shielding pipe 50.

In the embodiment given above, the clamping ring 90 is used as the fixing member that fixes the end portion of the electromagnetic shielding member 25 to the outer circumferential surface of the shielding pipe 50 in an electrically connected state. However, the configuration is not limited thereto. For example, instead of the clamping ring 90, a metal tie, a resin cable tie, an adhesive tape, or the like may be used as the fixing member.

The invention claimed is:

1. A wire harness comprising:
an electric wire including a core wire and an insulation coating that covers an outer circumference of the core wire;
an electromagnetic shield that surrounds an outer circumference of the insulation coating;
a connection terminal that is electrically connected to an end of the core wire;
a connector housing that holds the connection terminal and is made of a synthetic resin;
a shielding pipe that extends from an inside to an outside of the connector housing in a protruding manner; and
a fixing member that fixes an end of the electromagnetic shield to an outer circumferential surface of a portion of the shielding pipe that is disposed outside the connector housing in an electrically connected state, wherein:
an end of the electric wire is inserted in the shielding pipe while being exposed from the electromagnetic shield, and
the end of the electric wire is inserted in the connector housing via the shielding pipe and is connected to the connection terminal.

2. The wire harness according to claim 1 further comprising:
a first seal that is provided in an internal space of the portion of the shielding pipe that is disposed outside the connector housing; and
a first retainer that is attached to an end of the shielding pipe to prevent the first seal from being dislodged,
wherein the first seal is in intimate contact with an inner circumferential surface of the shielding pipe, and is also in intimate contact with an outer circumferential surface of the electric wire.

3. The wire harness according to claim 2,
wherein a protrusion that protrudes inward in a radial direction of the shielding pipe is formed on an inner circumferential surface of the shielding pipe at a position further inside the connector housing relative to the first seal.

4. The wire harness according to claim 3,
wherein the protrusion is formed continuously around the entire inner circumferential surface of the shielding pipe in a circumferential direction of the shielding pipe.

5. The wire harness according to claim 2,
wherein the first seal is provided at an overlapping position with the fixing member in a lengthwise direction of the shielding pipe.

6. The wire harness according to claim 2, wherein:
the shielding pipe is made of a metal,
the first retainer is made of a synthetic resin,
the first retainer includes a main body that is fitted to the inside of the shielding pipe and a cover that is formed on an outer circumferential surface of the main body,
the cover is formed to cover an end edge of the shielding pipe from an outer side thereof in a radial direction, and
the end of the electromagnetic shield is formed to surround an outer circumference of cover.

7. The wire harness according to claim 1,
wherein the shielding pipe, the electromagnetic shield, and the fixing member are formed using a metal material of a same type.

8. The wire harness according to claim 1 further comprising:

a second seal that is provided in an internal space of the connector housing; and a second retainer that is attached to an end of the connector housing to prevent the second seal from being dislodged, wherein the second seal is in intimate contact with an inner circumferential surface of the connector housing, and is also in intimate contact with an outer circumferential surface of the shielding pipe.

9. The wire harness according to claim 1 further comprising a conductive cylinder that is electrically connected to the shielding pipe in an internal space of the connector housing.

* * * * *